(12) United States Patent
Jeon et al.

(10) Patent No.: US 7,643,067 B2
(45) Date of Patent: Jan. 5, 2010

(54) RECTIFICATION SYSTEM AND METHOD OF STEREO IMAGE IN REAL-TIME

(75) Inventors: Jae Wook Jeon, Suwon-si (KR); Seung Hun Jin, Suwon-si (KR); Jung Uk Cho, Suwon-si (KR); Sung Kee Park, Seoul (KR); Munsang Kim, Seoul (KR); Kyoung Mu Lee, Seoul (KR); Jong Eun Byun, Anyang-si (KR)

(73) Assignee: Sungkyunkwan University Foundation for Corporate Collaboration, Suwon-si, Gyeonggi-do (KR)

( * ) Notice: Subject to any disclaimer, the term of this patent is extended or adjusted under 35 U.S.C. 154(b) by 439 days.

(21) Appl. No.: 11/677,324

(22) Filed: Feb. 21, 2007

(65) Prior Publication Data

US 2008/0002879 A1    Jan. 3, 2008

(30) Foreign Application Priority Data

Jun. 29, 2006    (KR) ............... 10-2006-0059210

(51) Int. Cl.
| | |
|---|---|
| H04N 5/225 | (2006.01) |
| H04N 13/00 | (2006.01) |
| H04N 5/228 | (2006.01) |
| H04N 9/04 | (2006.01) |
| G06K 9/32 | (2006.01) |

(52) U.S. Cl. ............... 348/218.1; 348/42; 348/222.1; 348/273; 382/300

(58) Field of Classification Search ............. 348/218.1, 348/42, 181, 187, 188, 222.1, 273–280, 180; 382/154, 300
See application file for complete search history.

(56) References Cited

U.S. PATENT DOCUMENTS

| | | | | |
|---|---|---|---|---|
| 5,917,937 | A * | 6/1999 | Szeliski et al. | 382/154 |
| 6,101,455 | A | 8/2000 | Davis | |
| 6,108,005 | A * | 8/2000 | Starks et al. | 345/419 |
| 6,437,823 | B1 | 8/2002 | Zhang | |
| 6,516,087 | B1 * | 2/2003 | Camus | 382/154 |
| 6,985,175 | B2 | 1/2006 | Iwai et al. | |
| 7,466,336 | B2 * | 12/2008 | Regan et al. | 348/50 |
| 2002/0025075 | A1 * | 2/2002 | Jeong et al. | 382/217 |
| 2004/0105074 | A1 * | 6/2004 | Soliz et al. | 351/206 |
| 2004/0263613 | A1 * | 12/2004 | Morita | 348/51 |
| 2005/0117215 | A1 * | 6/2005 | Lange | 359/462 |

* cited by examiner

*Primary Examiner*—Nhan T Tran
*Assistant Examiner*—Quang V Le
(74) *Attorney, Agent, or Firm*—Blakely, Sokoloff, Taylor & Zafman LLP

(57) ABSTRACT

Disclosed is a system and a method for rectifying stereo images, which are acquired by two cameras, in real-time by using a calibration matrix resulting from camera calibration. The system includes a coordinate generation module; a rectification coordinate generation module; a bilinear interpolation value generation module; a rectification coordinate memory; a bilinear interpolation memory; an image buffer; an rectification module; and a control module. A structure of a hardware system capable of real-time stereo rectification is provided, and the operation results have been verified by implementing a hardware device. The real-time stereo rectification system makes it possible to acquire rectified images in real-time without using a separate computer system or a software program.

10 Claims, 6 Drawing Sheets

RECTIFICATION SYSTEM AND METHOD OF STEREO IMAGE IN REAL-TIME

CROSS-REFERENCE TO RELATED APPLICATION

The present application claims, under 35 U.S.C. §119(a), the benefit of the filing date of Korean Patent Application No. 10-2006-0059210 filed on Jun. 29, 2006, the entire contents of which are hereby incorporated by reference.

BACKGROUND OF THE INVENTION

1. Field of the Invention

The present invention relates to a system and a method for rectifying stereo images in real-time. More particularly, the present invention relates to a system and a method for rectifying stereo images, which are acquired by two cameras, in real-time by using a calibration matrix resulting from camera calibration.

2. Description of the Prior Art

In general, when a stereo vision operation is conducted by using two cameras, stereo matching for finding corresponding points from two images is one of the most challenging issues.

Images acquired by two cameras are not parallel to each other in general, and, in order to explain the relationship between both cameras with regard to the acquired images, the concept of a baseline, an epipole, and an epipolar line must be defined.

The baseline refers to a line joining the centers of two cameras; the epipole refers to a point of intersection between the baseline and an image plane; and the epipolar line refers to a line joining an image point to the epipole.

In order to find corresponding points from two images A and B, which have different epipolar lines, one point of image A must be compared with every point of image B (i.e. two-dimensional searching), in theory. This requires a large amount of calculation and renders no real-time operation possible.

Therefore, in order to find identical points from two images in real-time, their epipolar lines must be made to coincide so that the searching range is reduced to one dimension.

To this end, it is conventional to obtain image conversion matrices based on characteristic values resulting form camera calibration and apply the matrices to respective images acquired by cameras.

This process involves complex operations, including multiplication and inversion of 3×3 matrices. As a result, real-time implementation becomes difficult, and the overall system complexity increases.

In an attempt to shorten the operation time, operation results may be pre-stored for respective pixels and referred to as a lookup table when necessary. However, this approach cannot be applied flexibly when camera parameters (e.g. relative location, focusing distance) vary at a later time.

Technologies regarding camera calibration are disclosed in U.S. Pat. Nos. 6,437,823, 6,101,455, and 6,985,175.

These technologies, which are mainly focused on camera calibration, propose systems and methods for calibration and rectification regardless of speed.

However, the conventional technologies disclosed in the above-mentioned patent publications are hardly applicable to industrial fields (e.g. robots) due to the limitation that they use universal computers or structured light.

SUMMARY OF THE INVENTION

Accordingly, the present invention has been made to solve the above-mentioned problems occurring in the prior art, and an object of the present invention is to provide a system and a method for rectifying stereo images, which are acquired by cameras, in real-time by using a hardware system, not a software system, so as to flexibly cope with the change of camera parameters.

In order to accomplish this object, there is provided a system for rectifying a stereo image in real-time, the system including a coordinate generation module for generating a two-dimensional coordinate of a currently inputted pixel based on a control signal generated by a camera picking up an image; a rectification coordinate generation module for generating a rectification coordinate based on a calibration matrix inputted from camera calibration; a bilinear interpolation value generation module for calculating a bilinear interpolation value for bilinear interpolation of a rectification result and generating a corresponding code; a first memory for storing the rectification coordinate generated by the rectification coordinate generation module; a second memory for storing the bilinear interpolation value generated by the bilinear interpolation value generation module; an third memory for storing an input image and an output image; a rectification module for applying the stored rectification coordinate and the stored bilinear interpolation value based on the output image so as to rectify the image and output a rectified coordinate value; and a control module for controlling and synchronizing the coordinate generation module, the rectification coordinate generation module, the bilinear value generation module, the first memory, the second memory, the third memory, and the rectification module.

The control module is adapted to initialize the system in response to a new camera calibration value input depending on whether or not a camera parameter has varied and actuate the rectification coordinate generation module and the bilinear interpolation value generation module so that the rectification coordinate value and the dual linear interpolation value are calculated again.

The range of coordinates generated by the coordinate generation module is identical to the image size, and, when a frame is completely received and followed by a subsequent frame, the coordinate generation module initializes coordinate values and starts a recount.

The rectification coordinate generation module is adapted to receive an input of a 3×3 matrix resulting from camera calibration and output coordinates of an image before rectification, which are to be referred to by respective coordinates after rectification.

The rectification module is adapted to retrieve a rectification coordinate value corresponding to a coordinate of the output image from the first memory, retrieve a bilinear interpolation code from the second memory, retrieve a pixel of an image before rectification and a peripheral pixel for interpolation from the third memory based on the rectification coordinate value, and perform bilinear interpolation by using the retrieved bilinear interpolation code.

The first and second memories are adapted to store coordinate values, as many as the entire number of pixels of an image, store results when the rectification coordinate generation module and the bilinear interpolation value generation module are initially operated, and perform only reading in a rectification process.

A pair of third memories is dimensioned to store an image of two frames for images received from respective cameras, and, when an input frame is written on one of the third memories, the other third memory reads an output frame.

In accordance with another aspect of the present invention, there is provided a method for rectifying a stereo image in real-time, the method including the steps of (a) calculating a two-dimensional coordinate of a currently inputted pixel by a coordinate generation module based on a control signal generated by a camera; (b) receiving an input of a 3×3 matrix resulting from camera calibration and outputting coordinates of an image before rectification, respective coordinates after rectification having to refer to the coordinates, by a rectification coordinate generation module; (c) generating a bilinear interpolation value by a bilinear interpolation value generation module; (d) storing an output from the coordinate generation module in a rectification coordinate memory; (e) storing an output from the bilinear interpolation value generation module in a bilinear interpolation memory; (f) storing an input image to an image buffer and outputting an output image from the third memory; and (g) starting an operation after the rectification coordinate generation module and the bilinear interpolation value generation module finish functioning so that bilinear interpolation is processed by the rectification module.

In step (c), the bilinear interpolation value generation module uses a divider result of the coordinate generation module and a reminder value of the divider so that, when the bilinear interpolation value is generated, the bilinear interpolation value is converted into a code based on a size comparison between each of the remainder values and divisors, and the number of bits used for the code is increased or decreased.

In step (g), the rectification module retrieves a rectification coordinate value corresponding to a coordinate of the output image from the rectification coordinate memory, retrieves a bilinear interpolation code from the bilinear interpolation memory, retrieves a pixel of an image before rectification and a peripheral pixel for interpolation from the image buffer based on the rectification coordinate value, and performs bilinear interpolation by solely using shift and an adder based on the retrieved bilinear interpolation code.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
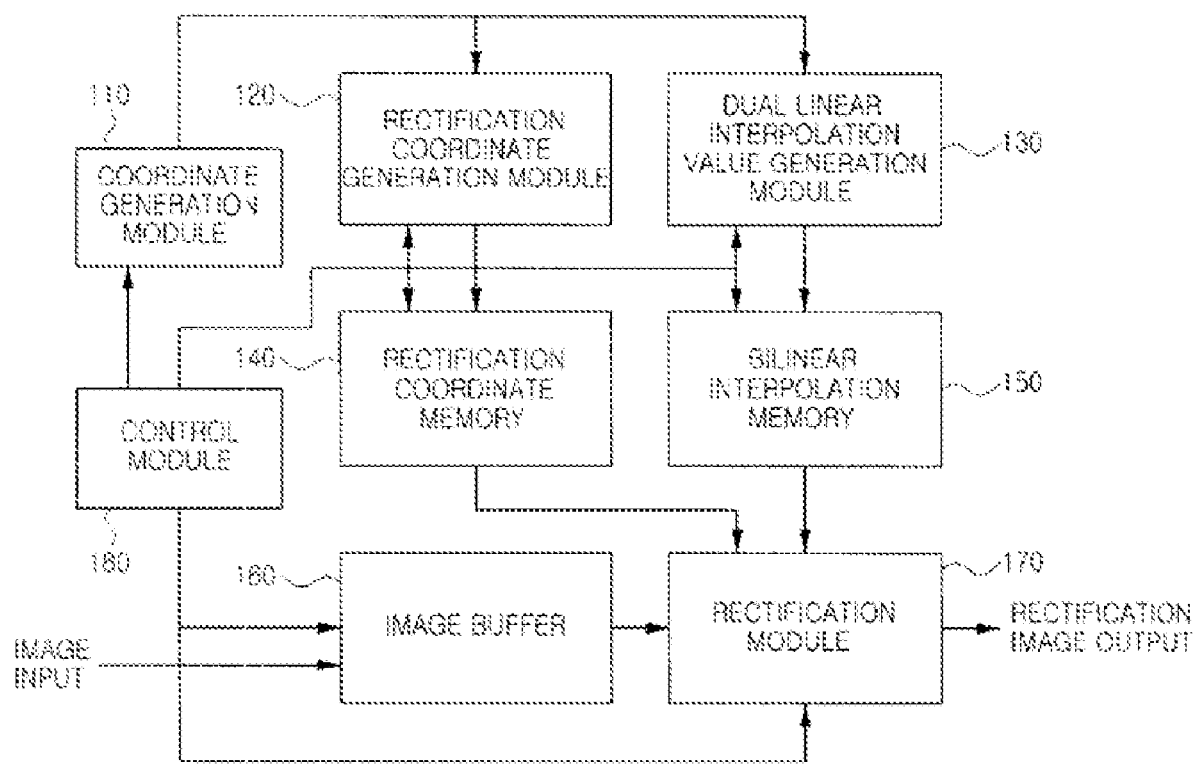
FIG. 1 is a block diagram showing a system for rectifying stereo images in real-time according to the present invention.

Hereinafter, a preferred embodiment of the present invention will be described with reference to the accompanying drawings. In the following description and drawings, the same reference numerals are used to designate the same or similar components, and so repetition of the description of the same or similar components will be omitted.

Figure 2:
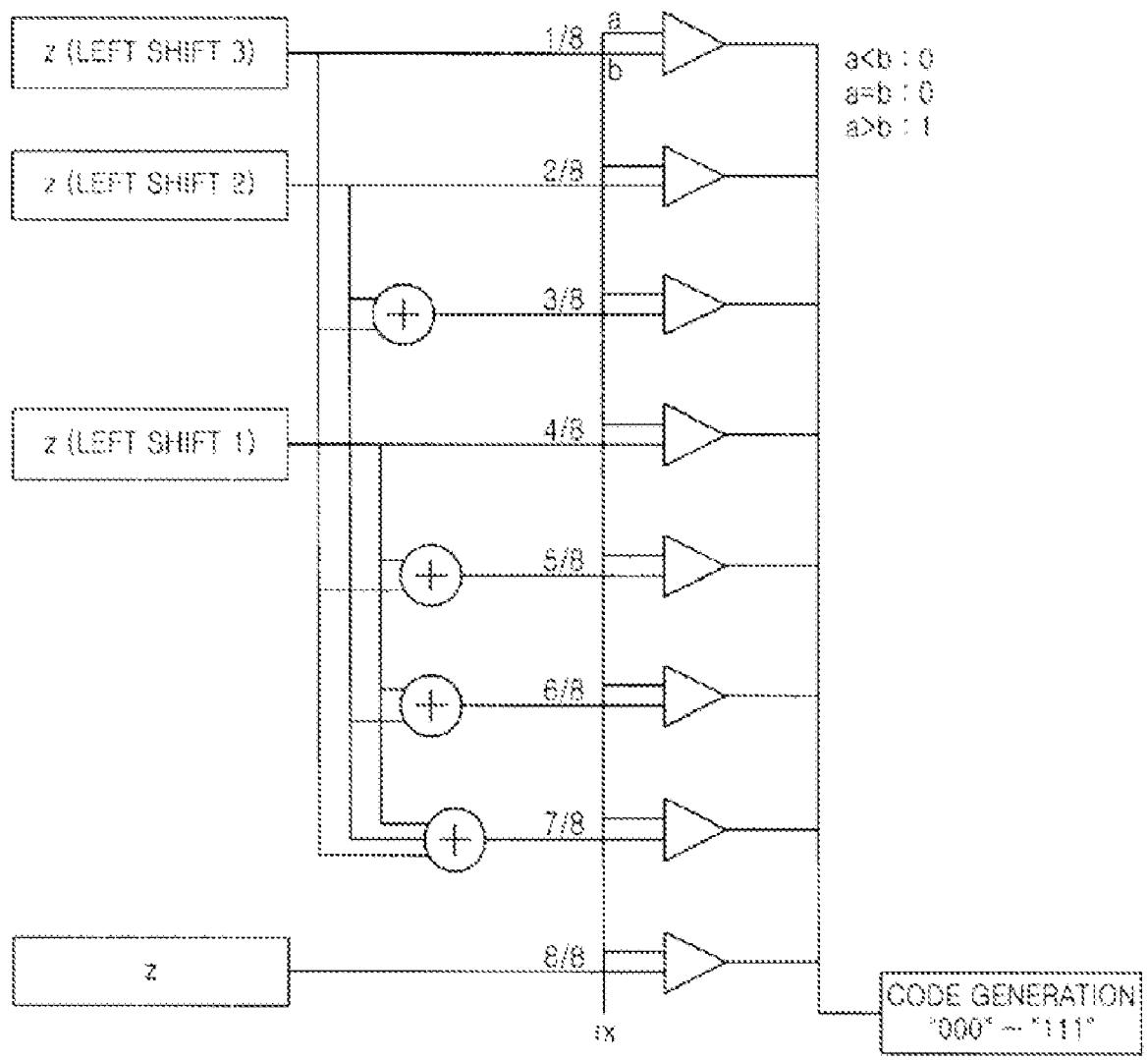
FIG. 2 is a block diagram showing a method for generating a linear interpolation code for bilinear interpolation according to the present invention.
Figure 3:
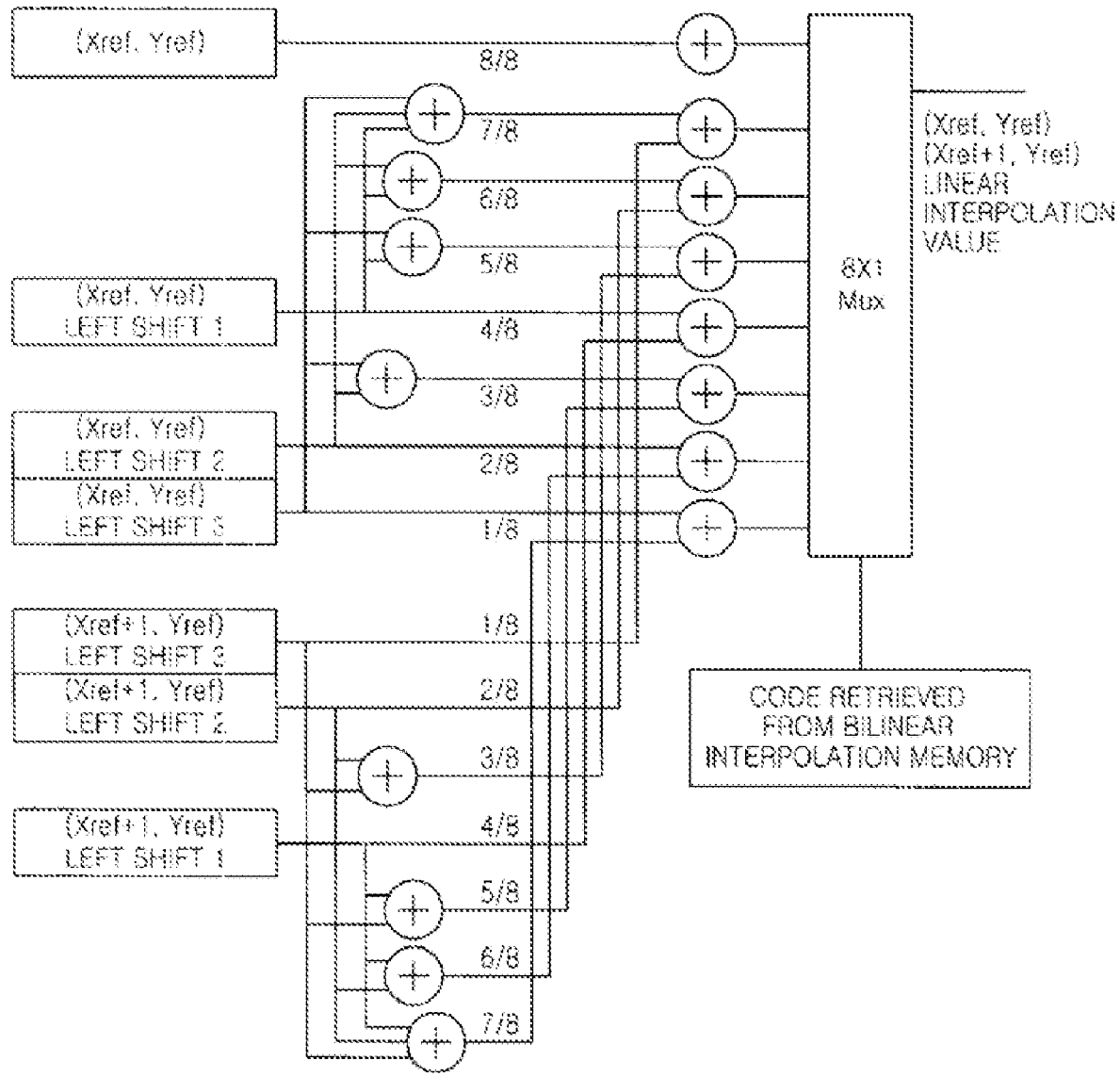
FIG. 3 is a block diagram showing a method for linear interpolation based on a linear interpolation code according to the present invention.
Figure 4:
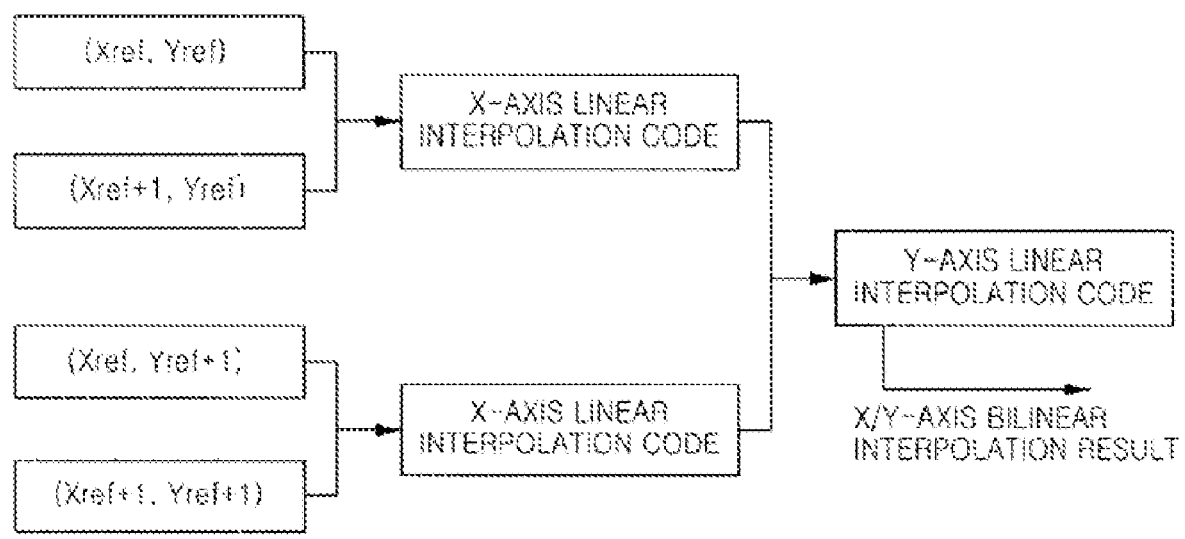
FIG. 4 is a block diagram showing a process for bilinear interpolation based on connection between linear interpolation modules according to the present invention.
Figure 5:
FIG. 5 shows an example of an actual image obtained by a camera.
Figure 6:
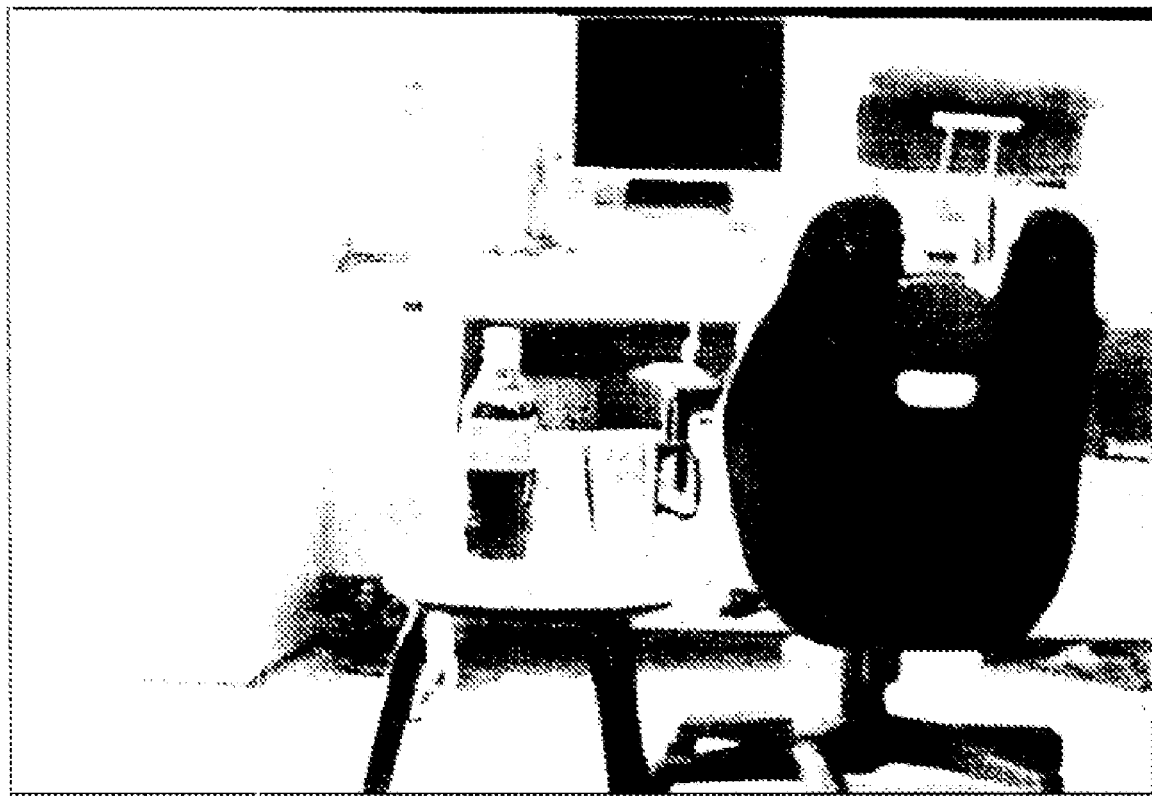
FIG. 6 shows an example of an image rectified by a system for rectifying stereo images in real-time according to the present invention.

FIG. 1 is a block diagram showing a system for rectifying stereo images in real-time according to the present invention; FIG. 2 is a block diagram showing a method for generating a linear interpolation code for bilinear interpolation according to the present invention; FIG. 3 is a block diagram showing a method for linear interpolation based on a linear interpolation code according to the present invention; FIG. 4 is a block diagram showing a process for bilinear interpolation based on connection between linear interpolation modules according to the present invention; FIG. 5 shows an example of an actual image obtained by a camera; and FIG. 6 shows an example of an image rectified by a system for rectifying stereo images in real-time according to the present invention.

Referring to FIG. 1, a system for rectifying stereo images in real-time according to an embodiment of the present invention includes a coordinate generation module 110; a rectification coordinate generation module 120; a bilinear interpolation value generation module 130; a rectification coordinate memory 140; a bilinear interpolation memory 150; an image buffer 160; a rectification module 170; and a control module 180.

The coordinate generation module 110 calculates two-dimensional coordinates of currently inputted pixels based on control signals generated by cameras, which pick up images.

The range of coordinates is the same as the image size. After a frame is completely received and followed by a subsequent frame, coordinate values are initialized, and a recount starts.

The rectification coordinate generation module 120 receives an input of a 3×3 matrix resulting from camera calibration and outputs coordinates of an image before rectification, which are to be referred to by respective coordinates after rectification.

The operation in this regard is defined by equations (1) and (2) below.

$$\begin{bmatrix} m_{11} & m_{12} & m_{13} \\ m_{21} & m_{22} & m_{23} \\ m_{31} & m_{32} & m_{33} \end{bmatrix} \times \begin{bmatrix} x' \\ y' \\ 1 \end{bmatrix} = \begin{bmatrix} m_{11} \times x' + m_{12} \times y' + m_{13} \\ m_{21} \times x' + m_{22} \times y' + m_{23} \\ m_{31} \times x' + m_{32} \times y' + m_{33} \end{bmatrix} = \begin{bmatrix} x'' \\ y'' \\ z \end{bmatrix} \quad (1)$$

$$\begin{bmatrix} x'' \\ y'' \\ z \end{bmatrix} \div z = \begin{bmatrix} x_{ref} \\ y_{ref} \\ 1 \end{bmatrix} \quad (2)$$

Wherein, $m_{11}$-$m_{33}$ constitute a 3×3 matrix M resulting from camera calibration; x' and y' refer to coordinates of the image after rectification; and $x_{ref}$ and $y_{ref}$, which result from the operation, refer to coordinates of the image before rectification, which are to be referred to.

The operation is performed only once if a parameter of the camera has changed, and is not performed until the parameter changes again.

The bilinear interpolation value generation module 130 generates a bilinear interpolation value by using the remainder value of $x_{ref}$ and $y_{ref}$ which are results of output from the coordinate generation module 110.

The operation in this regard is defined by equations (3) and (4) below.

$$x'' \div z = x_{ref} + r_x \quad (3)$$

$$y'' \div z = y_{ref} + r_y \quad (4)$$

Encoding is conducted based on size comparison between respective remainder value $r_x$ and $r_y$ and the divisor z.

The code used in this regard is shown in FIG. 2. For example, in the case of implementation for verification, a 3-bit bilinear interpolation code is used for each axis.

The precision of the bilinear interpolation can be raised or lowered by increasing or decreasing the number of bits used for the code.

The bilinear interpolation value generation module 130 performs the operation only once if a parameter of the camera has changed, and does not perform it until the parameter changes again, as in the case of the rectification coordinate generation module 120.

The rectification coordinate memory 140 receives an input of $x_{ref}$ and $y_{ref}$, which are results of output from the coordinate generation module 110, and stores them.

The address stored in this regard is set to be the same as the coordinates x' and y' of the output image.

The rectification coordinate memory 140 performs writing while the coordinate generation module 110 is functioning and, after the operation of the coordinate generation module 110 is over, performs reading only.

The bilinear interpolation memory 150 receives an input of a code, which has been generated as an output from the bilinear interpolation value generation module 130, and stores it.

The address stored in this regard is set to be the same as the coordinates z' and y' of the output image.

The bilinear interpolation memory 150 performs writing while the bilinear interpolation value generation module 130 is functioning and, after the operation of the bilinear interpolation value generation module 130 is over, performs reading only.

The image buffer 160 is used to store input images and read output images.

Although images are inputted in a sequence by a camera, a point $x_{ref}$, $y_{ref}$ of an image before rectification, which corresponds to a point x', y' of the image after rectification, is not sequential.

This means that, if images inputted from a camera are read as they are, the pixel of a desired coordinate pair may fail to be obtained.

In contrast, values stored in the image buffer 160 are accessible with regard to their address (i.e. in a non-sequential manner). Therefore, input images are stored in the image buffer 160 first, and the pixel value of a desired coordinate pair is read.

Considering that images are continuously inputted in a camera, a pair of image buffers 160 are used so that, while one buffer stores input images, the other buffer reads output images.

As such, the image buffers 160 are dimensioned to store two frame images, i.e. input and output images.

The rectification module 170 starts operation after the rectification coordinate generation module 120 and the bilinear interpolation value generation module 130 finish functioning.

With regard to a point x', y' of an output image, the rectification module 170 retrieves corresponding rectification coordinate values from the rectification coordinate memory 140 and retrieves a bilinear interpolation code from the bilinear interpolation memory 150.

After retrieving the rectification coordinate values $x_{ref}$, $y_{ref}$, the rectification module 170 retrieves four pixel values corresponding to $(x_{ref}, y_{ref})$, $(x_{ref}+1, y_{ref})$, $(x_{ref}$ hd ref+1), and $(x_{ref}+1, y_{ref}+1)$ from the image buffer 160 in order to process bilinear interpolation.

Based on the retrieved bilinear interpolation code, the rectification module 170 performs bilinear interpolation as shown in FIGS. 3 and 4.

Two pixels adjacent to each other along the x-axis are subjected to linear interpolation by using a value of the retrieved code, which corresponds to the x-axis. The resultant is subjected to additional linear interpolation by using a value corresponding to the y-axis. As such, bilinear interpolation is conducted.

In addition, the fact that shift and addition operations alone are used when the bilinear interpolation code is sued for the bilinear interpolation facilitates implementation of a hardware system and enables real-time operations.

Furthermore, the overall system complexity is substantially decreased because neither a multiplier nor divider is used.

Pixels subjected to bilinear interpolation are outputted at the same clock as the input to the camera, and stereo rectification has been applied to the pixels. Therefore, the range of searching is limited to one dimension when the image is used for stereo matching at a later time. This remarkably reduces the amount of operation necessary for searching.

The control module 180 controls the overall operation and conducts synchronization.

The control module 180 initializes the system in response to a new camera calibration value input depending on whether or not the camera parameter has varied. The control module 160 actuates the rectification coordinate value generation module 120 and the bilinear interpolation value generation module 130 so as to calculate the rectification coordinate value and the bilinear interpolation value again.

In order to verify the system for rectifying stereo images in real-time according to the present invention, the system is designed based on VHDL, which is a hardware description language, and is combined with a frame grabber module, which has been constructed separately. Then, device Virtex 4 (XC4VLX200-FF1513C), available from Xilinx Co., is used to confirm that images are processed correctly.

FIG. 5 shows an original image which is to be rectified, and FIG. 6 shows an image rectified by a system for rectifying stereo images in real-time, which has been implemented for verification.

As mentioned above, the present invention provides the structure of a hardware system capable of real-time stereo rectification, and the operation results have been verified by implementing a hardware device.

The real-time stereo rectification system makes it possible to acquire rectified images in real-time without using a separate computer system or a software program.

In addition, the stereo matching operation is limited to one-dimensional space, which substantially reduces the overall amount of searching and operation.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed:

1. A system for rectifying a stereo image in real-time, the system comprising:

a coordinate generation module for generating two-dimensional coordinates of a currently inputted pixel based on a control signal generated by a camera picking up an image;

a rectification coordinate generation module for generating a rectification coordinate based on a calibration matrix inputted from outside;

a bilinear interpolation value generation module for calculating a bilinear interpolation value for bilinear interpolation of a rectification result and generating a corresponding code;

a first memory for storing the rectification coordinate generated by the rectification coordinate generation module;

a second memory for storing the bilinear interpolation value generated by the bilinear interpolation value generation module;

a third memory for storing an input image and an output image;

a rectification module for applying the stored rectification coordinates and the stored bilinear interpolation value based on the output image so as to rectify the image and output rectified coordinate values; and a control module for controlling and synchronizing the coordinate generation module, the rectification coordinate generation module, the bilinear interpolation value generation module, the first memory, the second memory, the third memory, and the rectification module.

2. The system as claimed in claim 1, wherein the control module is adapted to initialize the system in response to a new camera calibration value input depending on whether or not a camera parameter has varied and actuate the rectification coordinate generation module and the bilinear interpolation value generation module so that the rectification coordinate value and the bilinear interpolation value are calculated again.

3. The system as claimed in claim 1, wherein a range of coordinates generated by the coordinate generation module is identical to an image size, and, when a frame is completely received and followed by a subsequent frame, the coordinate generation module initializes coordinate values and starts a recount.

4. The system as claimed in claim 1, wherein the rectification coordinate generation module is adapted to receive an input of a 3×3 matrix resulting form camera calibration and output coordinates of an image before rectification, respective coordinates after rectification having to refer to the coordinates.

5. The system as claimed in claim 1, wherein the rectification module is adapted to retrieve a rectification coordinate value corresponding to a coordinate of the output image from the first memory, retrieve a bilinear interpolation code from the second memory, retrieve a pixel of an image before rectification and a peripheral pixel for interpolation from the third memory based on the rectification coordinate value, and perform bilinear interpolation by using the retrieved bilinear interpolation code.

6. The system as claimed in claim 1, wherein the first and second memories are adapted to store coordinate values as many as the entire number of pixels of an image, store results when the rectification coordinate operation module and the bilinear interpolation value generation module are initially operated, and perform only reading in a rectification process.

7. The system as claimed in claim 1, wherein a pair of third memories is dimensioned to store an image of two frames for images received from respective cameras, and, when an input frame is written on one of the third memories, other third memory reads an output frame.

8. A method for rectifying a stereo image in real-time, the method comprising:
(a) calculating two-dimensional coordinates of a currently inputted pixel by a coordinate generation module based on a control signal generated by a camera;
(b) receiving an input of a 3×3 matrix resulting from camera calibration and outputting coordinates of an image before rectification, respective coordinates after rectification having to refer to the coordinates, by a rectification coordinate generation module;
(c) generating a bilinear interpolation value by a bilinear interpolation value generation module;
(d) storing an output form the coordinate generation module in a rectification coordinate memory;
(e) storing an output from the bilinear interpolation value generation module in a bilinear interpolation memory;
(f) storing an input image in an image buffer and outputting an output image from the third memory; and
(g) starting an operation after the rectification coordinate generation module and the bilinear interpolation value generation module finish functioning so that bilinear interpolation is processed by the rectification module.

9. The method as claimed in claim 8, wherein, in step (g), the rectification module retrieves a rectification coordinate value corresponding to a coordinate of the output image from the rectification coordinate memory, retrieves a bilinear interpolation code from the bilinear interpolation memory, retrieves a pixel of an image before rectification and a peripheral pixel for interpolation from the image buffer based on the rectification coordinate value, and performs bilinear interpolation by solely using shift and an adder based on the retrieved bilinear interpolation code.

10. The method as claimed in claim 8, wherein, in step (c), the bilinear interpolation value generation module uses a divider result of the coordinate generation module and a remainder value of the divider so that, when the bilinear interpolation value is generated, the bilinear interpolation value is converted into a code based on a size comparison between each of the remainder values and divisors, and a number of bits used for the code is increased or decreased.

* * * * *